Sept. 7, 1937.  W. E. BRILL  2,092,599
PISTON
Filed Jan. 9, 1935
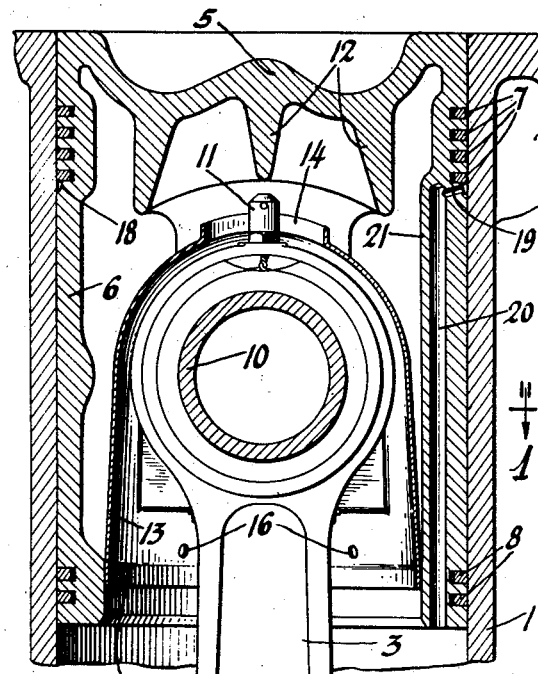
Fig. 1
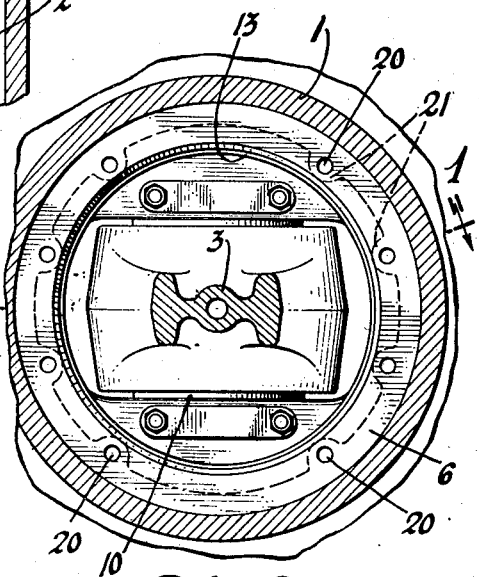
Fig. 2
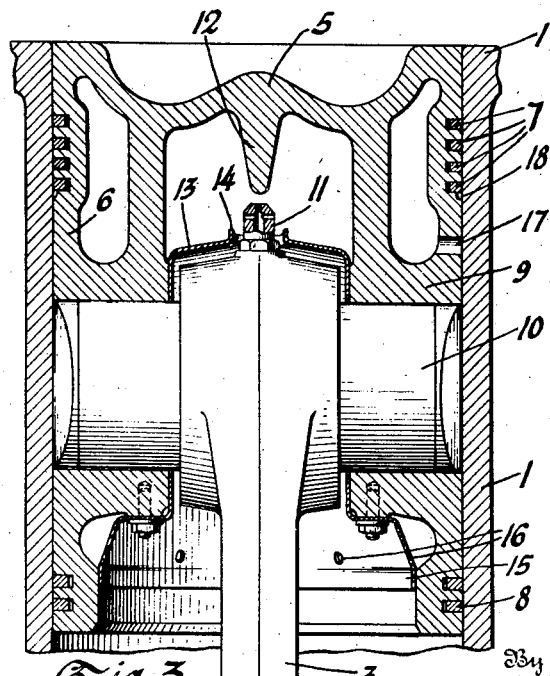
Fig. 3
Fig. 4
Inventor
William E. Brill
Attorneys Patented Sept. 7, 1937

2,092,599

UNITED STATES PATENT OFFICE 2,092,599

PISTON

William E. Brill, Cleveland, Ohio, assignor to General Motors Corporation, Detroit, Mich., a corporation of Delaware Application January 9, 1935, Serial No. 949

4 Claims. (Cl. 309—8)

This invention relates to internal combustion engines and more particularly to an improvement in pistons.

The invention has to do particularly with a type of piston which is provided with a cooling pocket or well to contain a supply of engine lubricating oil bathing the head and skirt during engine operation and serving as a heat exchanging medium to transfer heat from the normally hot head to the normally cool skirt and from which the heat is absorbed by the air or water cooled cylinder wall.

It is an object of the invention to provide a structure by which an abundance of lubricating oil is available and is supplied to the bearing surfaces and returned promptly to the crankcase without the likelihood of oil passing beyond the piston into the engine combustion chamber.

The invention will be best understood upon reference to the accompanying drawing, wherein Figure 1 is a vertical section of an engine cylinder and piston assembly and is taken on lines 1—1 of Figure 2; Figure 2 is a transverse section of the engine cylinder looking upwardly at the piston shown in Figure 1; Figure 3 is a longitudinal vertical section taken at right angles to the section of Figure 1, and Figure 4 is a fragmentary sectional view illustrating a slight modification of the structure shown in Figure 1.

In the drawing the numeral 1 indicates an engine cylinder having a water jacket 2 which forms a part of the engine cooling system. For the sake of simplicity only a fragment of the cylinder is shown in the drawing, it being understood that the engine cylinder has associated therewith a combustion chamber at its upper end and a crankcase at its lower end. Reciprocable within the cylinder and connected by the rod 3 with the engine crankshaft is a hollow piston comprising a head 5 and a skirt 6. Carried by the skirt in axially spaced relation near opposite ends of the piston are two groups 7 and 8 of packing rings located within suitable grooves and in wiping engagement with the cylinder wall to serve as seals and prevent leakage of gas from the combustion chamber into the crankcase, and of oil from the crankcase into the combustion chamber.

Interiorly of the skirt the hollow piston is provided with apertured bosses 9 for mounting a pin or trunnion shaft 10, by which the rod 3 is pivotally joined to the piston. For the purpose of lubricating the pivotal connection it is customary to provide a drilled opening through the shank of the rod, which is connected with the engine operated pressure lubricating system. Oil fed through the rod to the bearing, discharges through a nozzle 11 threaded into an opening in the upper end of the rod and is thrown by the nozzle against the underside of the piston head 5. In order to increase heat radiating surface, the piston head is preferably provided with a number of fins 12. The oil dropping from the head falls into a pocket near the bottom of the skirt formed, in cooperation with the skirt wall, by a sheet metal shell or baffle 13. The body of oil retained within the pocket and splashed back and forth between the piston head and skirt during piston reciprocation, serves to absorb heat from the head and transfer it to the skirt. In this way excessive temperature of the head portion of the piston directly exposed to the heat of combustion, is prevented, and a more uniform temperature throughout the whole of the piston results. Heat is transferred rapidly from the skirt into the cylinder wall for dissipation in the engine cooling system.

The sheet metal baffle 13 extending into the hollow piston surrounds the end of the connecting rod and fits between the piston pin bosses 9. At its upper portion it is provided with an elongated slot defined by an upstanding flange 14 to accommodate oscillation of the discharge nozzle 11. At its lower end it flares outwardly and terminates in an annular rim 15 in close fitting engagement with the interior of the piston wall near the bottom. One or more metering openings 16 may be provided at any convenient height in the pocket for the return to the crankcase of oil within the cooling pocket. The size of the metering openings will depend upon the amount of oil supplied to the pocket, and in addition to insuring the retention of a sufficient body of oil within the pocket also provides for the circulation of fresh oil so that a high temperature of the body of heat exchanging medium is avoided.

In place of, or in addition to, the metering openings 16, the wall of the skirt may be provided with one or more drilled openings 17 communicating the interior of the pocket with the bearing surface of the piston intermediate the top and bottom packing rings, and through which oil may pass from the pocket to the cylinder wall to insure ample lubrication of the piston and cylinder wall surfaces.

To return to the crankcase the excess oil wiped from the cylinder wall on the down stroke of the piston, an annular oil collecting groove or pocket 18 is formed in the piston immediately below the lowermost ring of the upper group of rings 7. From the collecting recess 18 one or more lateral holes 19 lead inwardly, each to an axially extending return passageway 20 formed in the skirt wall to discharge at the bottom of the skirt and below the cooling pocket. To afford the return passageway for oil, the skirt is formed on its interior with a number of inwardly extending longitudinal bosses or ribs 21 which can be drilled out from the bottom throughout substantially the length of the skirt.

In addition to the communicating passage 19 between the drilled opening 20 and the bearing surface near the upper group of rings, an additional communication between the bearing surface and the return duct may be provided near the lower group of rings, as is shown in the sectional view Figure 4. In this case the ring grooves for the packing rings 8' and the drilled opening 20' intersect or open into each other. By means of the intersecting openings, oil may pass either to or from the bearing surface depending upon whether the bearing surfaces are under supplied or oversupplied.

I claim:

1. A chambered piston having a skirt and a peripheral oil collecting groove near the upper end of the skirt and being characterized by a series of ribs formed interiorly of the skirt and extending longitudinally thereof in circumferentially spaced relation, a drain passage open at its lower end and extending through each rib from the lower end of the skirt to a point adjacent said groove, and a connecting passage leading through the skirt from said groove into the drain passage in the interior rib.

2. A chambered piston having a skirt and a peripheral ring groove near the head of the skirt, said piston being characterized by a cylinder oil drain passage formed in the wall of the skirt and extending axially through the skirt wall from the lower end thereof to adjacent said ring groove, and a lateral passage leading from the drain passage to a point immediately below the ring groove, said passage being open at its lower end for the discharge of oil draining into the passage.

3. In a chambered skirted piston having an oil scraper ring near the top thereof, an annular collecting pocket beneath the scraper ring, and an open ended drain passage extending axially through the skirt wall between the pocket and the lower end of the skirt to discharge oil from the pocket at the bottom of the skirt.

4. In a hollow skirted piston having an oil scraper ring adjacent the top thereof and a pocket interiorly of the skirt to contain a heat exchanging medium,—a series of circumferentially spaced axially extending ribs integral with the skirt on the inner face thereof, a lateral drain passage leading inwardly into each rib from beneath the scraper ring and an open ended passage through the rib, communicating with said lateral passage at its upper end and ending at the bottom of the skirt for the free discharge beyond the pocket of oil deflected thereinto through the lateral passage by the action of the scraper ring.

WILLIAM E. BRILL.